United States Patent

Brescia et al.

[11] Patent Number: 5,922,267
[45] Date of Patent: Jul. 13, 1999

[54] METHOD OF MAKING A ROTATIONALLY MOLDED CONTAINER RIM

[75] Inventors: Anthony J. Brescia, Huntersville; Smith E. Trent, III, Statesville, both of N.C.

[73] Assignee: Toter, Inc., Statesville, N.C.

[21] Appl. No.: 08/882,257

[22] Filed: Jun. 25, 1997

Related U.S. Application Data

[62] Division of application No. 08/567,541, Dec. 5, 1995, abandoned.

[51] Int. Cl.⁶ .................................................. B29C 41/06
[52] U.S. Cl. ............................................................ 264/310
[58] Field of Search ..................................... 264/310, 311, 264/301, 302, 303, 306

[56] References Cited

U.S. PATENT DOCUMENTS

| | | |
|---|---|---|
| 3,214,506 | 10/1965 | Corbin, Jr. . |
| 3,529,743 | 9/1970 | Ehrbar et al. . |
| 3,840,141 | 10/1974 | Allom et al. . |
| 4,214,670 | 7/1980 | Berger et al. . |
| 4,550,849 | 11/1985 | Adsit . |
| 4,709,833 | 12/1987 | Granberg et al. . |
| 5,538,158 | 7/1996 | Prout et al. . |
| 5,582,322 | 12/1996 | Prout et al. . |
| 5,778,899 | 8/1998 | Branham . |
| 5,786,405 | 7/1998 | Prout et al. . |

Primary Examiner—Karen Aftergut
Attorney, Agent, or Firm—Finnegan, Henderson, Farabow, Garrett, & Dunner, LLP

[57] ABSTRACT

A rotationally molded container rim and method for fabrication thereof. The inventive method includes rotationally molding a container while at the same time integrally molding a circumferential rim having an enclosed interior void. Molten plastic and unmelted particles flow from a primary portion of the mold through a gap of uniform width into a secondary mold portion to form the rim. During molding, air is vented from the enclosed void to ambient air outside the mold through a vent opening. The vent opening preferably includes a hollow tube. The rotationally molded container rim that is formed according to the inventive method preferably includes walls that form an enclosed polygonal section. The walls enclose the interior void and at least one vent opening leads from the interior of the rim to the outside of the container.

14 Claims, 5 Drawing Sheets

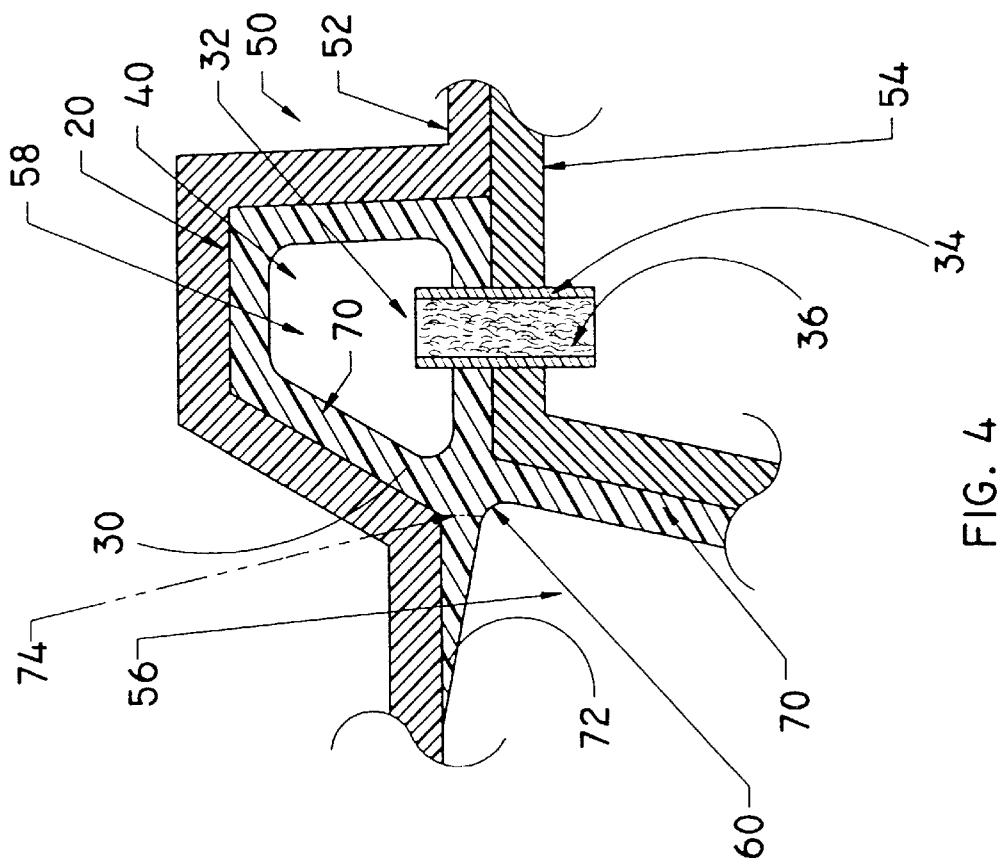
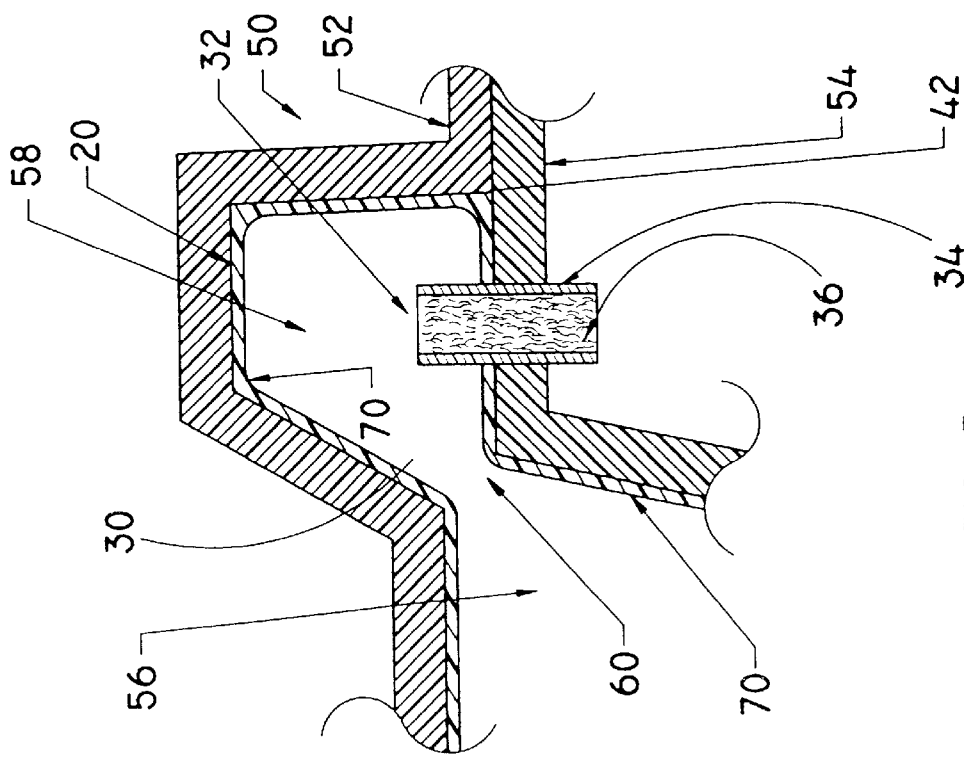

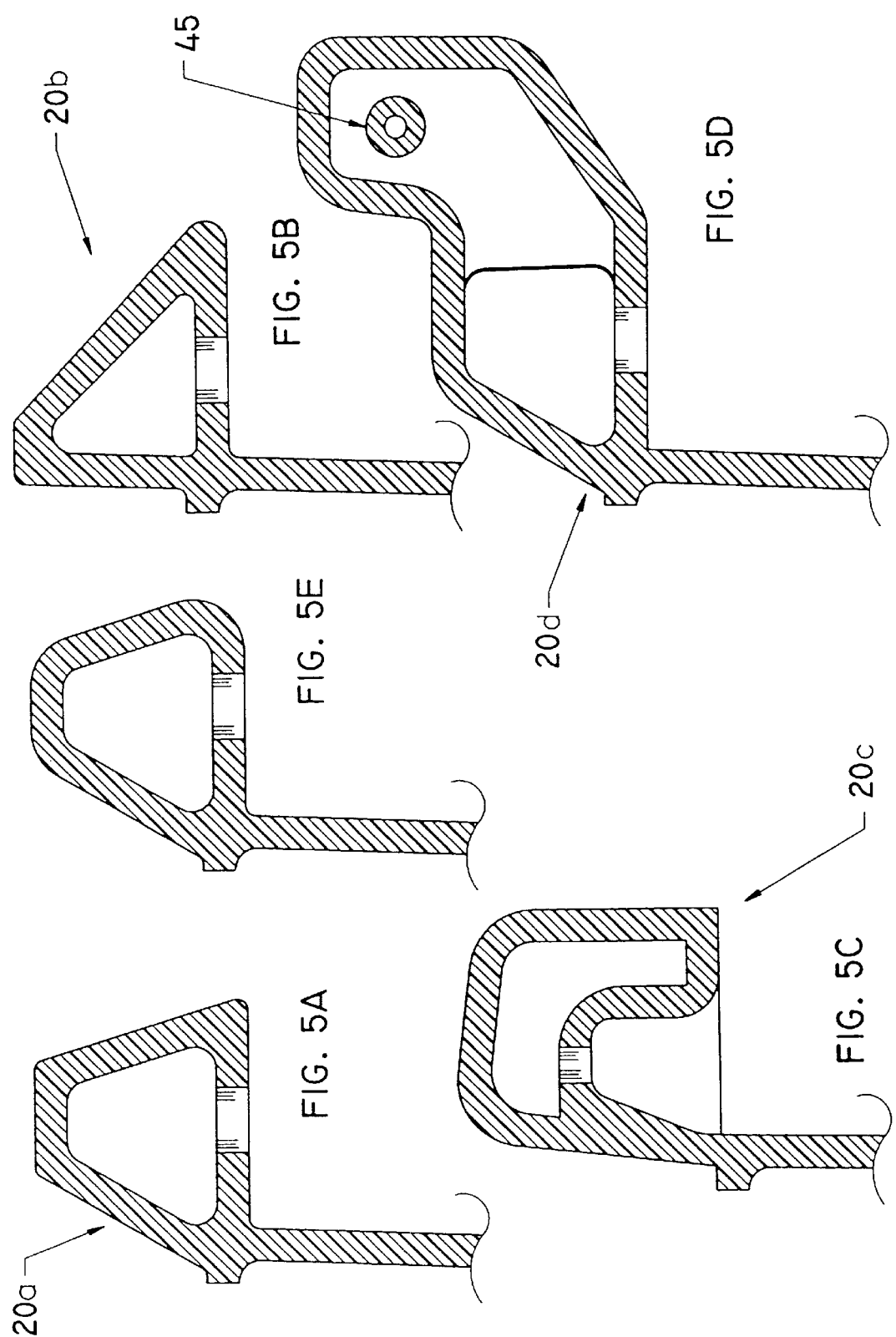

METHOD OF MAKING A ROTATIONALLY
MOLDED CONTAINER RIM

This is a division of application Ser. No. 08/567,541, filed Dec. 5, 1995, now abandoned.

FIELD OF THE INVENTION

The present invention relates generally to rotationally molded plastic containers and particularly to an integrally molded, enclosed, polygonal rim for such a container.

BACKGROUND OF THE INVENTION

The rims of rotationally molded containers in the past have generally been formed in a rolled over or flared configuration. Such a configuration may not be sufficiently rigid to be sturdy, and may not have an appropriate shape or surface area to attach accessories. It is therefore desirable to provide an enclosed polygonal rim for containers, such as refuse containers.

Rotational molding is a well known technique for molding hollow plastic containers. Rotational molding provides advantages over other molding processes, such as blow-molding and injection molding. For example, rotational molding produces strong, one-piece, low stress article that are not weakened by joints or seams, it allows relatively complex articles to be constructed, and it permits inserts and accessories to be more easily integrally molded into an article.

Rotational molding is accomplished melting particles of a thermoplastic resin, such as polyethylene or polypropylene in a heated, biaxially-rotating mold. The shape of the article to be molded generally corresponds to the interior shape of the mold. The thermoplastic resin particles melt and puddle in the bottom of the mold. As the mold is rotated simultaneously about two axes, all interior surfaces of the mold rotate through the melted plastic and unmelted particles, causing the melted plastic to coat the interior surfaces of the mold and conform to the mold in layers. The process continues with the multiple layers becoming progressively thicker until all of the melted plastic coats the interior of the mold.

After the plastic has melted and conformed to the mold's interior, the mold is moved to a cooling chamber where it is cooled by air and/or water. After the plastic has fully solidified, the mold is opened and the molded article is removed. Rough edges and unwanted sections of plastic are then trimmed off to give the article its final shape.

Rotational molding does have disadvantages, however. One major disadvantage of rotational molding is that it does not easily lend itself to the formation of additional or secondary enclosed voids. An inherent characteristic of rotational molding is that all surfaces of the mold must remain exposed to heat and to the molten plastic long enough to become coated with molten plastic. A section that has limited access for the molten plastic or heat and that is prematurely sealed off will not receive enough molten plastic.

Several techniques have been used to form secondary enclosed voids in rotationally molded articles. The most obvious method is to mold various components separately and then fasten them together to enclose a hollow void. However, this results in seams and joints, which sacrifice strength. Another method involves molding an article as one piece and then bending a portion of the article over itself to enclose a void. This results in at least one seam, however, in addition to possibly weakening the plastic where it is bent.

The most desirable technique thus far developed to form a secondary enclosed void in a rotationally molded article involves providing a relatively narrow gap or slot between the main interior portion of the mold and a secondary interior portion, in which the enclosed void will form. As the rotational molding process begins, the gap is open to allow passage of molten plastic and unmelted particles from the mold's main portion into the secondary portion. Therefore, the interior wall in the secondary portion will be coated with layers of molten plastic at the same time that the interior of the main portion of the mold is coated. Eventually, however, the thickness of the plastic layers increases to the point where the gap separating the two portions of the mold is completely filled or bridged with plastic. A wall of plastic therefore forms in the gap and separates the resulting enclosed void from the main interior of the molded article.

Thus the size and shape of the gap becomes very important. The larger the gap, the more molten plastic will flow into the enclosed void before it seals off. On the other hand if the gap is too large, the gap will not seal, leaving openings, and the object will be improperly formed.

During rotational molding to form an article having a secondary enclosed void, some of the air in the secondary portion of the mold is displaced by the inflowing plastic. At the beginning of the process, when the gap is still relatively open, the air in the secondary portion is simply displaced back through the gap into the main portion. However, as the layers of plastic build up to close the gap and form the wall that seals off the enclosed void, the enclosed void must be vented to allow the air to escape. Left unvented, air pressure (back pressure) in the enclosed void can prevent the walls of the rim from thickening sufficiently as the gap is closed off.

One approach to venting an enclosed void in a rotationally molded article is demonstrated in a prior art bin molded of high density polyethylene, which includes an integrally molded rim enclosing a hollow void throughout its circumference. The rim of this prior art bin is generally elliptical or teardrop-shaped, having rounded side walls. The mold for creating this prior art bin includes a circumferential gap or slot that extends continuously adjacent the top of the mold between the main portion and the rim portion of the mold. The rim portion of the mold has radiused interior walls that curve away from the gap. Such a curved wall shape may suffer drawbacks in strength and rigidity. Further, the shape is not conducive to the attachment of lids, handles, etc.

Further in the prior art bin, to vent the void within the rim during rotational molding, the gap in the bin mold between the main portion and the rim portion includes two enlarged, widened sections. These wide sections remain open during later stages of the molding process while the rest of the gap's circumference is being filled in to form the wall that encloses the rim void. The enclosed void of the rim is therefore vented into the interior of the main portion during molding.

One disadvantage of this venting method is that the wide sections of the gap, which serve as the vents, may not ever completely close during molding. If this occurs, the enclosed void in the rim will be open to the interior of the bin in the places where the separating wall did not completely form. This can cause several problems with the bin. For example, the strength, integrity, and rigidity of the bin will be compromised by the open gap in the bin's wall. Also, material within the bin will be able to leak into the interior of the rim through the gap, causing cleaning and sanitation problems.

Another disadvantage of the venting method used with this prior art bin involves the opposite situation. Instead of leaving an unfilled gap, the wide sections of the gap that acts as interior vents may close too early in the molding process. In this case, the purpose of providing vents will be negated. The result of premature vent closing will be that the rim walls will be formed substantially thinner than the walls of the main portion of the bin, thereby weakening the rim.

In one attempt to overcome this disadvantage (FIG. 6), a prior art bin's rim is formed having generally radiused or curved walls leading from the gap, so that molten plastic can easily flow into the rim during molding, ostensibly preventing premature gap closure.

As previously stated, the resulting curved shape of the rim has limitations from the standpoint of the rigidity and strength to the rim. Further, the curved rim surfaces do not provide a good lifting surface, nor are there any flat surface areas to which accessories and the like may be attached.

Therefore, there remains a need for new and improved rotationally molded container rim having a strong, rigid, enclosed, polygonal cross section. There also remains a need for containers having enclosed rims to be vented to the outside during molding in such a way as to ensure even and complete formation of both the rim itself and the wall separating the rim's hollow interior from the main portion of the bin.

OBJECTS AND SUMMARY OF THE INVENTION

In view of the above, an object of the present invention is to provide a rotationally molded container having an integrally molded, polygonal, enclosed peripheral rim that is structurally sound throughout its circumference.

Another object of the present invention is to provide an improved technique for venting an enclosed void in a rotationally molded container rim to the exterior of the mold during the molding of the container.

Another object of the present invention is to provide a hollow, rotationally molded container rim that includes a circumferential void completely sealed off from the interior of the container itself by an evenly formed separating segment or wall.

Another object of the present invention is to provide a rotationally molded container rim that has a generally polygonal cross section.

Another object of the present invention is to provide a hollow, rotationally molded container rim that has walls of consistent, relatively uniform thickness.

Another object of the present invention is to provide a rotationally molded container rim having walls that are strong and rigid enough to support molded-in inserts or accessories mounted to surfaces of the rim.

Another object of the present invention is to provide a rotationally molded container rim that can include a plurality of flat external surfaces to which mount accessories.

The present invention achieves these and other objects by providing a method for rotationally molding a polygonal container rim that includes an enclosed circumferential void. The method of the invention includes molding a container from a molten thermoplastic resin in a primary interior portion of a heated, biaxially-rotating mold, while at the same time integrally molding a circumferential enclosed rim, which has an enclosed circumferential void, around the open end of the container in a secondary interior portion of the mold.

To integrally mold the enclosed rim, a circumferential gap or slot is provided adjacent the top section of the mold. The gap connects the primary interior portion of the mold with the secondary interior portion. Therefore, the gap permits the molten plastic and unmelted particles to flow from the primary interior portion into the secondary interior portion to form the rim. To ensure uniform filling of the cap with layers of molten plastic, the entrance gap is preferably formed with substantially equal vertical and horizontal dimensional components throughout the circumference. Venting is accomplished through the enclosed rim wall. The width of the gap must be large enough to allow complete formation of the rim walls, yet small enough to ensure complete closure of the gap.

Because there are no wide sections of the gap to serve as vents, air in the enclosed void is vented during molding of rim through a vent opening extending from the secondary interior portion of the mold to ambient air outside the mold. The vent opening preferably is formed by a hollow tube extending through the mold wall and upwardly into the interior of the rim through the bottom wall of the rim. To prevent molten plastic from escaping, through the tube, the vent tube includes a filter such as a wad of steel wool in its interior.

The enclosed, rotationally molded container rim that is formed according to the method of the invention includes an enclosed circumferential void and at least one vent opening leading from the interior of the rim to the exterior of the container. The preferred embodiment of the molded container rim includes at least three and preferably four integrally molded, substantially planar walls disposed at angles to one another to form an enclosed cross section. An inner rim wall, which extends upwardly from the body wall of the container, and a bottom rim wall are both connected to the body wall of the container by a bridging segment or wall extending around the open top of the container. The bridging segment is formed where the gap between the primary and secondary interior portions of the mold is bridged with molten plastic during molding.

Other aspects and advantages of the present invention will become apparent to those skilled in the art after a reading of the following description of the preferred embodiments when considered with the accompanying drawings.

BRIEF DESCRIPTION OF THE DRAWINGS

FIG. 3 is a cross section of the container mold and the box-shaped rotationally molded container rim of FIG. 2 as seen during the beginning of the molding process, including a depiction of the vent extending through the mold itself from the interior of the enclosed rim to the exterior of the mold;

FIG. 4 is the same cross section as FIG. 3, except showing the final stages of the molding process after the gap leading from the interior of the container to the interior of the enclosed rim has been closed off by molten plastic;

FIGS. 5A–5D are cross sections of various portions of the rotationally molded container rim formed according to the present invention, with FIG. 5A being representative of the major portion of the rim;

FIG. 5E is a cross section of an alternate configuration of the portion shown in FIG. 5A.

DETAILED DESCRIPTION OF THE PREFERRED EMBODIMENTS

Figures 1, 2:
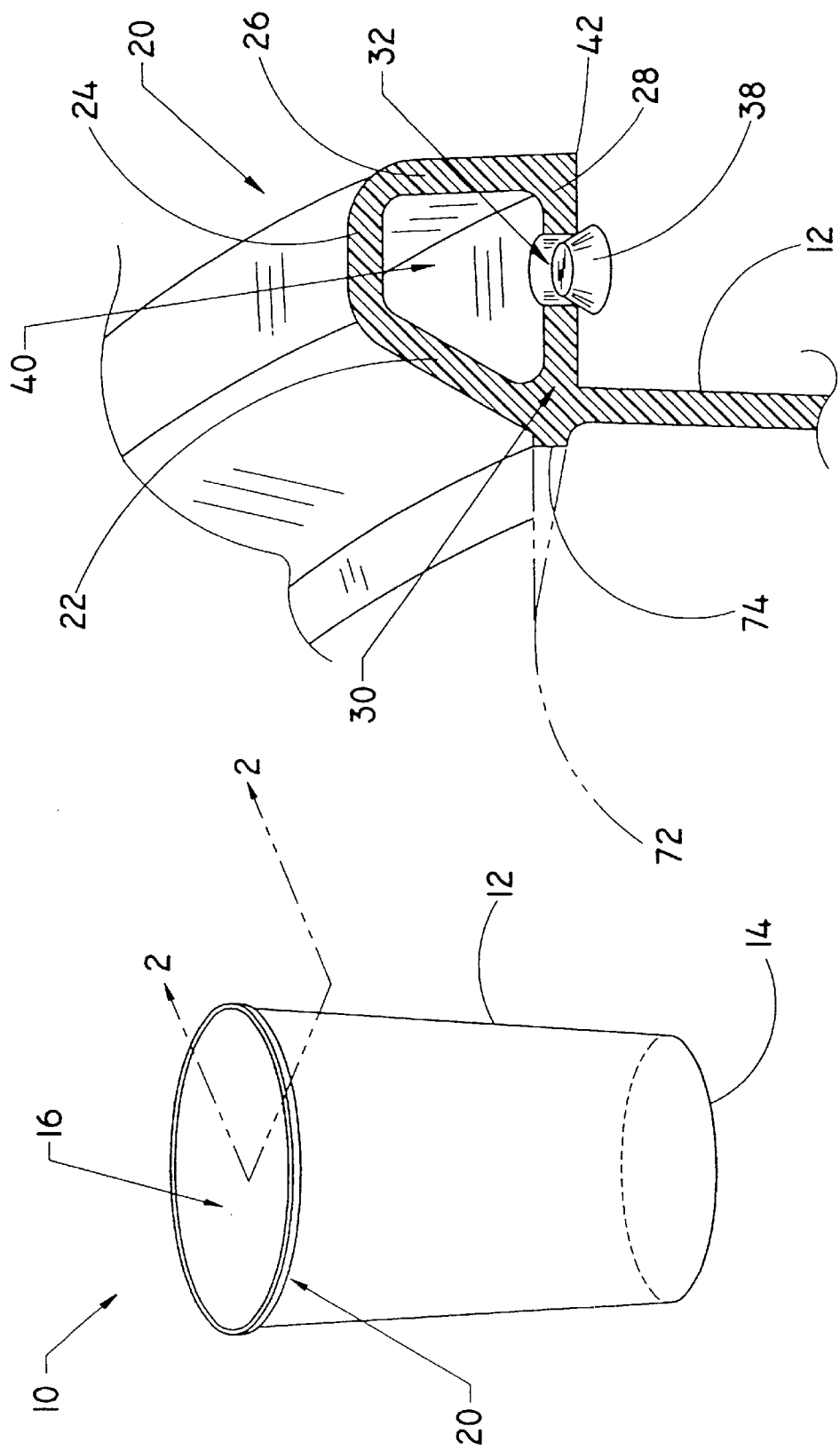
FIG. 1 shows a typical rotationally molded container having an integrally molded hollow, enclosed rim that is formed according to the present invention.
FIG. 2 is a perspective cross sectional view of a preferred embodiment of the enclosed, rotationally molded container rim taken along lines 2—2 of FIG. 1.

The present invention is described more fully below by referring to the drawings, in which a preferred embodiment is depicted. However, the present invention can take on many different embodiments and is not intended to be limited to the embodiment described herein.

Referring now to the drawings in general and FIG. 1 in particular, a rotationally molded container, generally designated 10, is shown formed according to the present invention. The container of the invention 10 is depicted as being a container for holding trash, recyclables, laundry, etc. and having a body wall 12, a bottom 14, an open top 16, and an integrally molded, enclosed rim 20 circumscribing the open top. However, the container 10 can be made in many different sizes, shapes, and styles and can be put to any conceivable use. Preferably fabricated from polyethylene, the container 10 may alternately be fabricated from any other thermoplastic material conventionally used for rotationally molding such articles, such as polypropylene or polyvinyl chloride.

Turning now to FIG. 2, this drawing shows a cross section of a preferred form of the enclosed rim 20 taken along lines 2—2 of FIG. 1. In this embodiment, the rim 20 includes four walls that are disposed at angles to one another to form a generally square cross section. However, as is shown in other embodiments to be described later, the walls can form other polygonal shapes, such as rectangles, parallelograms, and other quadrangles. It is also conceivable that the rim could comprise fewer or greater than four walls to form, for example, a triangular cross section. With any number of walls, it is preferable that each wall be disposed generally angularly to the other walls and that each wall have a generally flat outer surface. However, it is envisioned that a rounded rim could be fabricated using the venting method described below.

In the preferred embodiment of the enclosed rim 20, an inner wall 22 extends upwardly from a top edge of the body wall 12 of the container 10. The inner wall 22 is also shown in this example as being nearly coplanar with the container's body wall 12. A top wall 24 is integral with the inner wall 22 and extends outwardly from a top edge of the inner wall 22. An outside wall 26 is integral with the top wall 24 and extends downwardly from an outer edge of the top wall 24. An integral bottom wall 28 extends between a bottom edge of the outside wall 26 and the container's body wall 12. As will be more clearly understood upon a description of the molding process, the inner wall 22 and bottom wall 28 are integrally connected to each other and to the container's side wall 12 by a bridging segment 30 that extends circumferentially around the open top 16 of the container 10. Together, the rim walls define an enclosed void 40 that extends circumferentially around the container 10 throughout the interior of the rim 20.

Figure 2A:
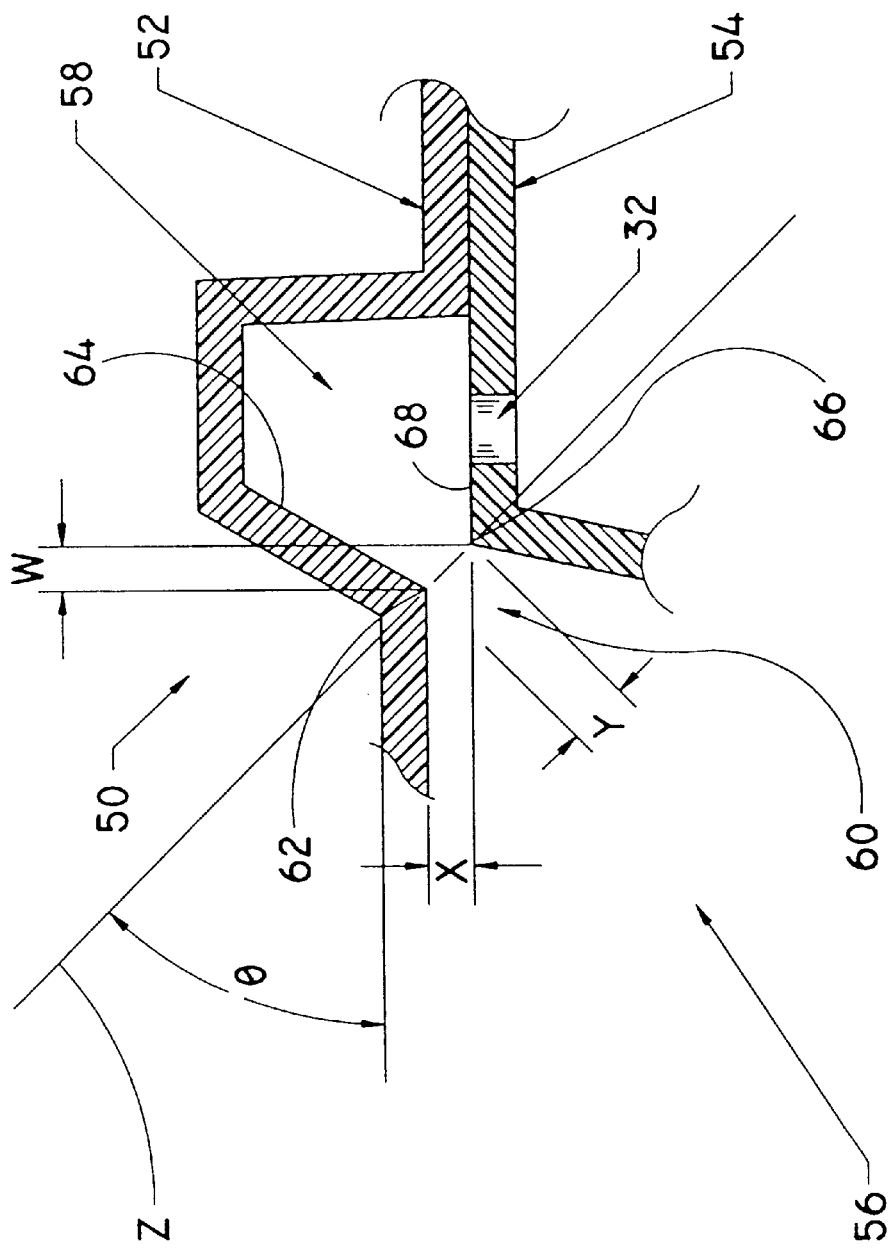
FIG. 2A is a cross section of the portion of the container mold that forms the enclosed rim shown in FIG. 2, depicting one appropriate geometrical configuration of the mold.

FIG. 2A shows a partial cross section of a mold 50 for forming a container having the enclosed rim 20 depicted in FIG. 2. As is conventional, the mold 50 comprises two shells 52, 54 that are separated to remove a molded article from within. As shown, the mold 50 includes a top shell 52 and a bottom shell 54. Together, the top and bottom shells 52, 54 define a primary interior portion 56, in which the body of the container 10 is formed, and a secondary interior portion 58, in which the integrally molded enclosed rim 20 with its enclosed void 40 is formed. A circumferential slot or gap 60 is provided adjacent the top of the mold 50 between the top and bottom shells 52, 54. The gap 60 connects the mold's primary interior portion 56 with its secondary interior portion 58. The gap 60 permits molten thermoplastic resin 70 to flow from the primary interior portion 56 into the secondary interior portion 58 to form the rim 20.

To achieve the objectives of the present invention, the gap 60 between the primary interior portion 56 and the secondary interior portion 58 is geometrically configured as shown in FIG. 2A. The gap preferably has a uniform width Y around its entire circumference, Y being defined as the distance between upper gap corner 62 and bottom gap corner 66. Preferably, the vertical component X of the gap width Y is approximately equal to the horizontal component W. The closer the X dimension is to the W dimension, the more likely the molten plastic will be deposited evenly onto all interior walls of the secondary interior portion of the mold 58, both above 64 and below 68 the gap 60, to form the enclosed rim 20. For example, with a 0.25 inch thick container wall, W and X could also have values of approximately 0.25 inches apiece, and Y could have a value of approximately 0.35 inches. Line Z is defined by the gap corners 62 and 66, and angle θ is defined as the angle between line Z and a horizontal plane of the mold 50. Preferably angle θ has a value of approximately 45 degrees.

The generally enclosed, square cross section of the rim 20, as shown in FIG. 2, imparts great strength and rigidity to the rim 20 itself and to the rim/container joint. The flat surfaces of the enclosed rim 20 permit mounting of any conventional accessories, such as handles, lids, hinge pivots, and the like to the rim 20 using any conventional mounting means. In the embodiment depicted, the rim 20 is approximately 1½ inch wide, although it could easily be formed larger. The walls of the rim 20 are preferably formed nearly as thick as the container's body wall 12, preferably on the order of a 2:3 thickness ratio. For example, with an approximately ¼" thick body wall 12, the walls of the rim 20 would be approximately ⅙" thick. Of course these thicknesses are only approximate examples, and the container 10 could be constructed according to the present invention with any reasonable wall thicknesses.

The enclosed rim 20 of the invention preferably includes a substantially angular corner 42 at the juncture of the outside wall 26 and the bottom wall 28. This bottom corner configuration 42 enables a person to better grip the rim 20 when lifting or carrying the container 10. The other corners of the rim 20, being more exposed, may be more rounded for safety.

As can be seen in FIG. 2, and as will be better understood after a description of the molding process, the enclosed rim 20 includes at least one vent opening 32 that extends from the enclosed void 40 inside the rim 20, through the rim 20, to the exterior of the container 10. Preferably, the rim 20 includes two vent openings 32 on opposite sides of the container 10. To help prevent foreign matter from entering the enclosed void 40 through the vent openings 32, the vent openings 32 are preferably disposed in the bottom wall 28 of the rim 20, but otherwise could be anywhere on the rim. In addition, the vent openings 32 may each be sealed with a vent plug 38. As an option (not shown), the enclosed void 40 may be filled after molding the container 10 by, for example, injecting foam or other filler into the enclosed void 40 through the vent openings 32.

Turning now to the description of the molding process, it should be understood that conventional aspects of rotational molding are known to those skilled in the art and will not be described herein in exhaustive detail. The following description of the inventive method will therefore focus on the formation of the enclosed container rim 20 with its enclosed void 40 and the means for venting the same during rotational molding.

As shown in FIGS. 3 and 4, the rotational molding process upon which the present invention improves involves building up of successive layers of molten thermoplastic resin 70 on the interior walls of the heated, biaxially-rotating mold 50. FIG. 3 depicts the beginning of the molding process when relatively few layers of plastic 70 have formed in the mold 50 and the gap 60 is still open. The interior walls in the secondary interior portion 58 are therefore coated with layers of molten plastic 70 at the same time that the interior walls of the main interior portion 56 are coated.

Eventually, the thickness of the plastic layers increases to the point where the gap 60 separating the two portions of the mold is completely filled or bridged with plastic to form the bridging segment 30. FIG. 4 depicts the conclusion of the molding process after all of the plastic 70 has formed layers in the mold 50 and gap 60 has been closed off by the bridging segment 30. The bridging segment 30 separates the enclosed void 40 in the rim 20 from the rest of the container 10.

Uniform and complete formation of the walls of the enclosed rim 20 and of the bridging segment 30 is accomplished because of the geometry of the gap 60 detailed above. The walls are formed with sufficient thickness because the gap 60 is configured to close off only after sufficient molten plastic has passed therethrough to form the rim 20. However, the gap 60 is not so wide as to leave an open space at the completion of molding.

In addition, the walls of the rim 20 are formed with even thicknesses throughout the rim 20 because of the precisely configured geometry of the mold 50. Because angle $\theta$ is approximately 45 degrees and because distance W is approximately equal to distance X, molten plastic will evenly form on walls 64 and 68 above and below the gap 60, respectively, as well as the remaining interior walls in the secondary portion 58 of the mold 50.

As also explained in the "Background," the secondary interior portion 58 of the mold must be vented, especially during later stages of the molding process, to permit the escape of air that is displaced by the inflowing molten plastic 70. Previously, venting has been accomplished by widening one or more sections of the gap to allow these sections to serve as vents into the primary interior portion of the mold after closure of the rest of the gap. This method works until the wide sections too are ultimately bridged with plastic. This non-uniform filling of the gap creates numerous problems with the quality of the resulting molded article.

According to the present invention, to ensure uniform filling of the circumferential gap 60 with layers of molten plastic, the gap 60 has a consistent, uniform width Y throughout its entire circumference. This uniformity of the gap 60 ensures that no section of the gap 60 is filled by plastic 70 before any other section of the gap 60. Instead, the gap 60 is filled at a uniform rate along its entire circumference. Uniform thickness of the bridging segment 30 throughout its circumference as well as uniform thickness of the rim walls around their circumference results from providing a gap 60 of consistent width Y around the entire mold 50.

To vent air from the enclosed circumferential void 40 during molding, at least one vent opening 32 extends from the secondary interior portion 58 of the mold to ambient air outside the mold 50. Although any number of vent openings can be provided, there are preferably two vent openings 32 on opposite sides of the mold 50. In the preferred embodiment, each vent opening 32 includes a hollow tube 34 that extends through the body of the mold 50. It should be appreciated that because of the external vent opening 32 of the invention, the vent opening(s) do not decrease in size during the molding operation. This enables the enclosed void to continue to release air to the outside. It is believed that, because of the external venting, the walls of the rim will form more properly.

As can be seen in FIG. 4, the exterior of the vent tube 34 extends through rim 20 during molding. While the tube 34 could extend to the exterior of the mold 50 through any wall of the mold's secondary interior portion 58, the vent tube 34 preferably extends downwardly so that the vent opening 32 will be formed in the bottom wall 28 of the rim 20. After molding of the container 10, the vent tube 34 is preferably removed from the rim 20 after molding to leave only the vent opening 32. As stated earlier, the vent opening 32 may then be sealed with a plug 38. While the size of the vent tube 34 is not crucial, in the preferred embodiment, each vent tube 34 is approximately $\frac{3}{8}$" to $\frac{1}{2}$" in diameter.

To prevent molten plastic 70 from escaping from the mold 50 through the vent tube 34 during molding, the vent tube 34 is disposed in such a way that the top end thereof is open to the enclosed void 40. Thus, the vent tube 34 preferably extends a greater distance into the secondary interior portion 58 than the thickness of the rim wall. Additionally, the vent tube 34 preferably includes a filter 36, such as a wad of steel wool in its hollow interior, to help prevent molten plastic 70 from escaping. The filter 36 also helps prevent water from entering the enclosed void 40 during cooling of the mold 50.

It should be pointed out that masses of excess plastic form during molding and must be trimmed after removal of the molded article from the mold 50. For example, in FIG. 4 is can be seen that excess plastic 72 forms against the top shell 52 of the mold over the open top 16 of the container 10 adjacent the bridging wall 30. This excess plastic 72 is trimmed off at trim line 74.

FIGS. 5A–5D are cross sections of alternate embodiments of the rotationally molded container rim 20, which are formed according to the present invention. FIG. 5A shows a generally trapezoidal-shaped cross section, wherein the top wall 24 of rim 20a is relatively narrow. FIG. 5B shows a rim 20b with a triangular cross section, wherein there is substantially no top wall and wherein the upper edge of the outside wall 26 meets the upper edge of the inner wall 24. FIG. 5C shows a rim 20c with a generally L-shaped cross section, wherein the bottom wall 28 comprises three segments. FIG. 5D shows a cross section of a rim 20d that is not uniform throughout its circumference. Instead, this rim 20d includes an extension that incorporates a hinge attachment point 45 integrally molded into the rim 20d. FIG. 5E is similar to FIG. 5A but shows a greater radius at the outer lower corner. Other alternate embodiments could include rims in which various other accessories, such as threaded inserts, are integrally molded into the walls of the rim.

Figure 6:
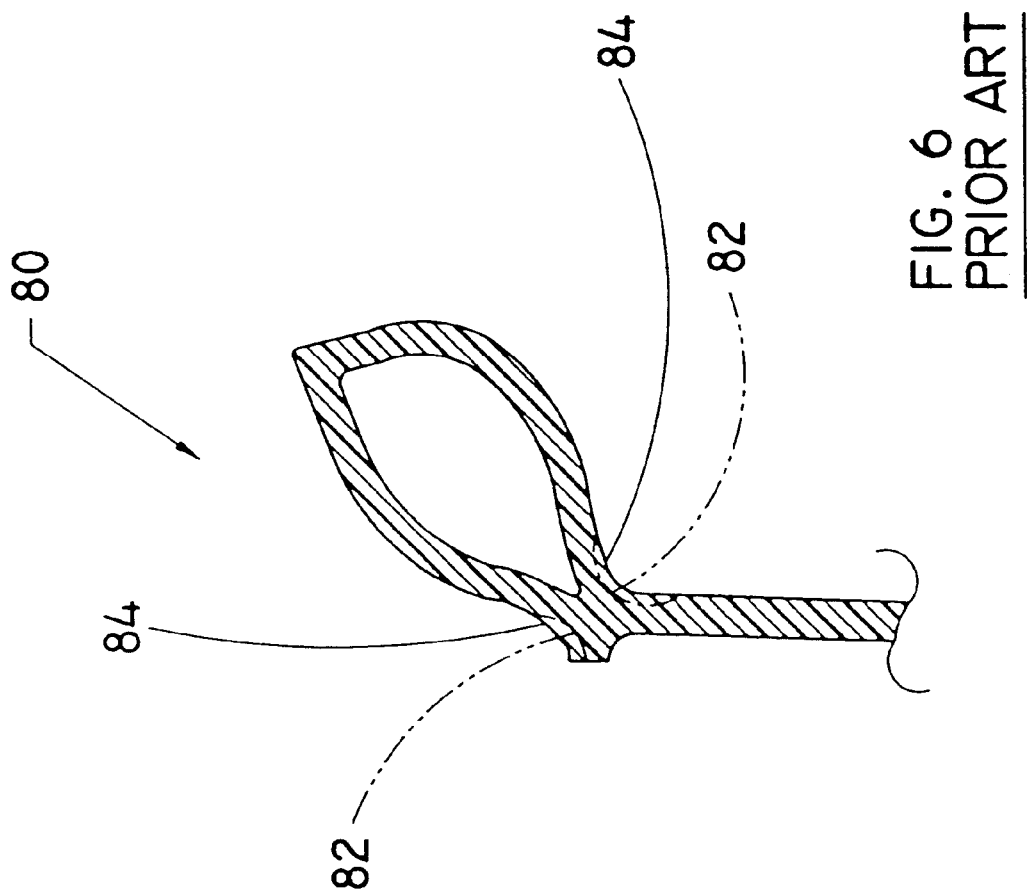
FIG. 6 is a cross section of the rim of a prior art rotationally molded bin.

FIG. 6 is a cross section of a rim 80 of a prior art bin, which is provided for reference and comparison to the enclosed rim 20 of the invention. As can be seen, the prior art bin's rim 80 has a generally elliptical or teardrop shape. This shape results in a weaker and less rigid rim than the enclosed rim 20 of the present invention. Also, this prior art rim has a smaller percentage of flat surface area to which accessories may be mounted than the inventive rim 20. Additionally, this rim 80 has a sharp corner as its uppermost and outermost point. The prior art rim 80 does not include an exterior vent leading from its interior to ambient air outside of the container. Instead, rim 80 is formed from a mold having several wide sections in the gap leading to the rim portion of the mold. The normal diameter of the gap is shown in FIG. 6 as numeral 82; whereas, the wide sections in the gap, which serve as internal vents, are shown in FIG. 6 as numeral 84. The wide sections 84 can cause non-uniformity of the rim wall thicknesses in this prior art bin.

Certain modifications and improvements will occur to those skilled in the art upon a reading of the foregoing description. It should be understood, however, that all such modifications and improvements have been deleted herein for the sake of conciseness and readability, but are properly within the scope of the following claims.

What is claimed is:

1. A method for rotationally molding a container having an enclosed rim, comprising the steps of:
   a) rotationally molding a container from molten thermoplastic resin in a primary portion of a heated, biaxially-rotating mold;
   b) integrally molding an enclosed rim around the container in a secondary portion of the mold during biaxial rotation of the mold by passage of the thermoplastic resin from the primary portion to the secondary portion through a peripheral gap in the mold between the primary and secondary portions;
   c) forming an enclosed interior void in the rim during biaxial rotation of the mold; and
   d) during biaxial rotation of the mold, venting air from the enclosed interior void through a vent opening in a wall of the rim to ambient air outside of the mold.

2. The method of claim 1, further comprising the step of plugging the vent opening upon completion of the rotational molding.

3. The method of claim 1, wherein the vent opening is formed by a hollow tube extending from the secondary portion of the mold, through a wall of the secondary portion of the mold.

4. The method of claim 3, wherein the hollow tube extends downwardly through a bottom surface of the rim.

5. The method of claim 3, wherein the hollow tube includes a filter.

6. The method of claim 5, wherein the filter includes steel wool inside the hollow tube.

7. The method of claim 1, wherein the peripheral gap is of generally uniform width throughout.

8. The method of claim 7, wherein the step of integrally molding the enclosed rim includes uniformly filling the peripheral gap with layers of molten thermoplastic resin to thereby enclose the interior void within the enclosed rim.

9. The method of claim 1 wherein the enclosed rim is of polygonal cross-section.

10. A method for rotationally molding a container having an enclosed rim, comprising the steps of:
    a) rotationally molding a container from molten thermoplastic resin in a primary portion of a heated, biaxially-rotating mold;
    b) integrally molding an enclosed rim around the container in a secondary portion of the mold during biaxial rotation of the mold by passage of the thermoplastic resin from the primary portion to the secondary portion through a peripheral gap in the mold between the primary and secondary portions;
    c) forming an enclosed interior void in the rim during biaxial rotation of the mold; and
    d) during the rotational molding, venting air from the enclosed interior void through a vent opening in a wall of the rim and through an adjacent outside wall of the mold.

11. The method of claim 10 further comprising the step of plugging the vent opening in the rim upon completion of the rotational molding.

12. The method of claim 10 wherein the vent opening is formed by a hollow tube extending from the secondary portion of the mold, through the rim and mold wall to ambient air outside the mold.

13. The method of claim 12 wherein the hollow tube includes a filter.

14. The method of claim 10 wherein the enclosed rim is of polygonal cross-section.

\* \* \* \* \*